United States Patent [19]

Day et al.

[11] 4,448,604

[45] May 15, 1984

[54] RECOVERY OF PRECIOUS METALS FROM LEACH RESIDUES

[75] Inventors: Joseph G. Day, Holmer Green; Jeffrey R. Taylor, Reading, both of England

[73] Assignee: Matthey Rustenburg Refiners (Pty) Limited, Johannesburg, South Africa

[21] Appl. No.: 417,616

[22] Filed: Sep. 12, 1982

[30] Foreign Application Priority Data

Sep. 16, 1981 [GB] United Kingdom ............... 8127977

[51] Int. Cl.³ ............................................. C22B 11/00
[52] U.S. Cl. ............................................. 75/63; 75/83
[58] Field of Search ................................... 75/83, 63

[56] References Cited

U.S. PATENT DOCUMENTS 4,135,923 1/1979 Day ................................ 75/83

FOREIGN PATENT DOCUMENTS 1481295 7/1977 United Kingdom ............ 75/118 R

Primary Examiner—M. J. Andrews
Attorney, Agent, or Firm—Cushman, Darby & Cushman

[57] ABSTRACT

This invention relates to the recovery of platinum group metals and Au and Ag from high sulphur content base metal sulphide ore residues and also to the separation of Ag from the other precious metals referred to.

The process for the recovery of platinum group metals, silver and gold from a base metal sulphide-containing leach residue comprises:

(a) smelting the said leach residue with a flux to produce:
  (i) a slag containing FeO, CaO and SiO$_2$ and
  (ii) a copper matte phase containing Ni, Fe, S, the platinum group metals, Au, Ag, Se and Te, (b) removing, if necessary, any excess of the elements iron or nickel or compounds thereof from the matte phase produced by step (a) by oxidation thus converting the said elements or compounds thereof to their respective oxides which then report to the slag phase, (c) contacting the matte phase produced by step (a) or the said matte phase after oxidation step (b) with one or more metals selected from the group Cu, Ni and Fe so as to produce a separate immiscible metallic phase containing platinum group metals, silver and gold (d) optionally recirculating the said separate metallic phase produced by step (c) to contact a separately produced matte phase produced by a step (a) or by steps (a) and (b) so as to at least partially redistribute the silver present out of the metallic phase and (e) recovering silver from the matte phase and the platinum group metals, gold and the proportion of silver which remains from the metallic phase.

13 Claims, No Drawings

RECOVERY OF PRECIOUS METALS FROM LEACH RESIDUES

This invention relates to the recovery of platinum group metals and Au and Ag from high sulphur content base metal sulphide ore residues and also to the separation of Ag from the other precious metals referred to.

The primary refining process for the separation of 98–99% by weight of the platinum group metals and gold leaves a high sulphur content base metal sulphide-containing fraction which contains Ag, Te, Se and the 1–2% balance of the platinum group metals and Au. Acid leaching removes the bulk of the Cu and Ni and a leach residue remains which consists of Cu, mainly as CuS, elemental and combined S, up to 100 ozs/tonne platinum group metals and gold, most of the Ag, Se and Te in the original matte and refractory oxides such as $SiO_2$, $Al_2O_3$, MgO and CaO. Depending on the leaching conditions any iron may be present either as the oxide or as a residue of the Jarosite type having the formula:

$$[NaFe_3(SO_4)_2(OH)_6 \cdot 2H_2O]$$

Recirculation of the residue to the primary smelting process may result in unacceptable build-up of elements such as Se and Te and is therefore to be avoided, if possible. It is one object of the present invention to recover platinum group metals, silver and gold from the leach residue without resorting to recycling and a further object is to enable a major proportion of the silver to be recovered in isolation from the platinum group metals.

According to one aspect of the present invention a process for the recovery of platinum group metals, silver and gold from a base metal sulphide-containing leach residue comprises the following steps:

(a) smelting the said leach residue with a flux to produce:
  (i) a slag containing FeO, CaO and $SiO_2$ and
  (ii) a copper matte phase containing Ni, Fe, S, the platinum group metals, Au, Ag, Se and Te, (b) removing, if necessary, any excess of the elements iron or nickel or compounds thereof from the matte phase produced by step (a) by oxidation thus converting the said elements or compounds thereof to their respective oxides which then report to the slag phase, (c) contacting the matte phase produced by step (a) or the said matte phase after oxidation step (b) with one or more metals selected from the group Cu, Ni and Fe so as to produce a separate immisicible metallic phase containing platinum group metals, silver and gold, (d) optionally recirculating the said separate metallic phase produced by step (c) to contact a separately produced copper matte phase produced by a step (a) or by steps (a) and (b) so as to at least partially redistribute the silver present out of the metallic phase and (e) recovering silver from the matte phase and the platinum group metals, gold and the proportion of silver which remains from the metallic phase.

Smelting may be carried out at step (a) of the invention by any convenient method. Suitable fluxes for smelting the leach residue at step (a) include iron oxide, silica and lime. Others may contain $Ca(OH)_2$, alkali metal carbonate, alkali metal chloride and an iron silicate based slag also containing CaO and MgO. The preferred flux is iron silicate which has an approximate composition range:

|  | % W/W |  |
| --- | --- | --- |
| CaO | 1–30 | (25) |
| MgO | 0–20 | — |
| FeO | 20–60 | (45) |
| $SiO_2$ | 30–45 | (30) | where the preferred composition is given in parentheses it is preferred to add flux within the range 2–3 times the weight of the leach residue. The smelting operation is preferably carried out in air at a temperature within the range 1100°–1300° C. $SO_2$ is evolved as a gas during the smelting operation. Copper is the major element present in the copper matte phase produced at step (a). If the matte phase produced at step (a) contains more than about 5% by weight iron (whether combined or uncombined) or more than about 8% by weight nickel (whether combined or uncombined) or the total of Fe and Ni exceeds 12% by weight the excess quantities of these metals need to be removed from the matte phase. We prefer to perform this operation at step (b) by conversion of the said elements to their respective oxides which then redistribute to the slag. Fe and Fe compounds are converted to FeO and Ni and Ni compounds to NiO. A suitable method of oxidation is by oxygen or air lancing at a temperature of 1200°–1250° C.

When Cu, Ni or Fe either individually or as an alloy are brought into contact with the matte in performing step (c) the said metal (or alloy) is molten and the matte must be in the liquid state. A separate immiscible metallic phase is produced and is formed by the said Cu and-/or Ni and/or Fe which is added. Cu is the preferred metal for addition. The distribution coefficients of the platinum group metals and gold favour the metallic rather than the matte phase and these elements therefore collect in the metallic phase. The distribution coefficients of Se and Te favour the matte phase, however.

An alternative to the addition of copper to the matte at step (c) is to continue the oxidation step (b) by continuing injection of oxygen or air into the matte phase until a sufficient proportion of $Cu_2S$ is converted to Cu metal:

$$Cu_2S + O_2 \rightarrow 2Cu + SO_2$$

Some Cu converts to the oxide and becomes associated with the slag but we have found sufficient Cu metal is formed by this procedure to form a separate immiscible phase which can act as a collector for the platinum group metals and gold.

"Contacting" at step (c) may therefore take place either by specific addition of metal or by the production of metal in situ.

The economic viability of the present invention may be improved by increasing the level of platinum group metals recovered in the separate immiscible metallic phase and at the same time minimising the concentration of Ag metal therein. These objectives are achieved by optional step (d) in which the immiscible metallic phase (bullion) is recirculated to contact a separately produced matte phase produced by a step (a). For ease of operation this separately produced phase is preferably produced subsequently although it may of course be produced earlier.

We have found that by bringing the phases into contact in this way the concentration of platinum group metal in the bullion is increased without detriment to its recovery. However, because the distribution coefficient of Ag between the two phases is close to unity, subsequent segregation of silver into the metallic (bullion) phase is considerably reduced. Thus, the net effect of recirculation is to significantly improve the effective separation of the platinum group metals from the silver.

Recovery of the silver platinum group metals and gold from their respective phases in step (e) may be performed by known methods. Examples of processes which may be used to recover the silver in the matte are as follows:

(a) The matte may be blown either in a Pierce Smith or Top Blown Rotary converter to blister copper-silver. The latter can then be either electro-refined, preferably in a divided cell where the silver may be cemented with copper or the blister copper can be atomised and leached in $H_2SO_4$ with an oxidising agent, such as $HNO_3$. The silver in the residue may then be refined in a Balbach cell.

(b) The matte is crushed, ground and leached directly in an autoclave with $H_2SO_4$ under air pressure of greater than 20 Bar and a temperature greater than 120° C. The silver in the residue may be electro-refined either in a Balbach cell or dissolved in $HNO_3$ and electro-refined in a Moebuis cell.

(c) The matte is crushed, ground and roasted at a temperature greater than 750° C. to oxidise the sulphide. The roasted product can then be leached with $H_2SO_4$ at atmospheric pressure and a temperature greater than 80° C. The silver in the residue may be recovered as in (b) above.

EXAMPLE 1

A leach residue containing

|  | % w/w |
|---|---|
| Au | 0.008 |
| Ag | 0.1 |
| Pt | 0.009 |
| Pd | 0.025 |
| Ir | less than 0.001 |
| Ru | 0.056 |
| Rh | 0.033 |
| Cu | 5.0 |
| Ni | 3.0 |
| Fe | 31.0 |
| S | 10.1 |
| Se | 0.03 |
| Te | 0.01 |
| $Al_2O_3$ | 2.5 |
| $SiO_2$ | 8.0 |
| MgO | minor quantity |
| CaO | minor quantity | was smelted with 23% $Ca(OH)_2$ and 23% $SiO_2$ by weight to give an olivine slag. The weight of the matte produced represented approximately 5% of the input leach residue.

The overall recovery of platinum group metals, silver and gold achieved with a 1:1 addition of copper to the smelted matte in accordance with the present invention was:

|  | % by weight recovery |
|---|---|
| Au | 98.3 |
| Ag | 72.0 |

|  | % by weight recovery |
|---|---|
| Pt | 98.0 |
| Pd | 96.0 |
| Ir | 95.0 |
| Ru | 98.0 |
| Rh | 98.0 |

EXAMPLE 2

A leach residue was nodulised, dried and smelted in a submerged carbon electrode furnace with twice its weight of slag. The slag had the following composition:

|  | % w/w |
|---|---|
| FeO | 23 |
| CaO | 12 |
| MgO | 17 |
| $Al_2O_3$ | 6 |
| $SiO_2$ | 42 |

When the charge was completely molten the carbon electrodes were withdrawn from the melt and air was injected into the matte at approximately 24 m³/hr.

Using this procedure most of the FeS in the matte was converted to FeO, which was collected in the slag, and $SO_2$. Air injection into the matte was continued until about 19% of copper bullion was produced.

Analyses of the original leach residue and resulting slag, matte and bullion were as follows:

| Input | Output | | |
|---|---|---|---|
| Leach Residue % w/w | Slag % w/w | Matte % w/w | Bullion % w/w |
| Cu 27.6 | 5.6 | 75.38 | 85.1 |
| Ni 3.66 | 1.19 | 1.59 | 5.34 |
| Fe 15.58 | 21.74 | 0.53 | 0.1 |
| S 23.25 | 0.06 | 17.8 | 1.27 |
| Se 0.33 | 0.006 | 2.24 | 0.18 |
| Te 0.05 | 0.001 | 0.07 | 0.07 |
| Ag 0.09 | 0.008 | 0.34 | 0.52 |

| g/tonne | g/tonne | g/tonne | g/tonne | % age recovery into bullion |
|---|---|---|---|---|
| Pt 22.0 | 0.37 | 0.5 | 585 | 94.6 |
| Pd 113.2 | 1.6 | 36.7 | 2100 | 88.3 |
| Rh 130.8 | 1.8 | 10.5 | 2900 | 92.5 |
| Au 57.6 | 0.53 | 5.5 | 1300 | 93.4 |
| Ru 199.6 | 2.7 | 8.5 | 2000 | 84.5 |
| Ir 10.6 | 0.1 | 0.06 | 129 | 91.2 |

EXAMPLE 3

47 Kgs of a leach residue containing the following.

| % by weight | | | | | | | |
|---|---|---|---|---|---|---|---|
| Cu | Ni | Fe | S | Se | Te | $SiO_2$ | $Al_2O_3$ |
| 20.2 | 1.15 | 21.0 | 26.35 | 0.54 | 0.16 | 7.15 | 0.9 |

| | | | | ppm | |
|---|---|---|---|---|---|
| Au | Ag | Pt | Pd | Ru | Rh |
| 82.6 | 1500 | 19.8 | 177 | 274 | 200 | was nodulised with 5% $Ca(OH)_2$, 3% $SiO_2$, 10% $Fe_2O_3$ and smelted in a small cupola furnace. The weight of slag produced was 2.08 Kg the weight of matte recovered was 8.46 Kgs. The matte had the following composition:

| | | % by weight | | | |
|---|---|---|---|---|---|
| Cu | Ni | Fe | S | Se | Te |
| 47.7 | 2.5 | 22.9 | 21.7 | 0.99 | 0.23 |

| | | ppm | | | |
|---|---|---|---|---|---|
| Au | Ag | Pt | Pd | Ru | Rh |
| 138 | 9730 | 1366 | 3073 | 428 | 460 |

A representative sample of the matte was melted by induction heating in a salamander crucible. A preformed slag consisting of 30% FeO, 25% CaO, 45% $SiO_2$ was melted on top of the matte. When the charge was completely molten, oxygen was injected into the matte at 1.5 liters min$^{-1}$ for 80 minutes. The analysis of the lanced matte was as follows:

| | | % by weight | | | |
|---|---|---|---|---|---|
| Cu | Ni | Fe | S | Se | Te |
| 71 | 3.2 | 1.5 | 19.1 | 1.12 | 0.27 |

| | | ppm | | | |
|---|---|---|---|---|---|
| Au | Ag | Pt | Pd | Ru | Rh |
| 462 | 14309 | 1541 | 4779 | 300 | 580 |

Sufficient copper metal was added to the melt to produce 6%, 22% and 36% of an immiscible Cu-PGM bullion. The respective recoveries of the PGM+Au into the bullion phase were as follows:

| % Wt of Cu—Bullion | % by weight of total precious metal present which is recovered in the bullion phase. | | | | | |
|---|---|---|---|---|---|---|
| | Au | Ag | Pt | Pd | Ru | Rh |
| 6 | 75 | 6 | 90 | 47 | 99 | 75 |
| 22 | 96.5 | 31 | 95 | 88 | 98 | 95 |
| 36 | 98 | 48 | 96.5 | 94 | 98 | 97 |

EXAMPLE 4

The lanced matte from Example 3 with the following analysis:

| | Cu | Ni | Fe | S | Se | Te |
|---|---|---|---|---|---|---|
| % | 71 | 3.22 | 1.54 | 19.1 | 1.12 | 0.27 |
| | Au | Ag | Pt | Pd | Ru | Rh |
| ppm | 462 | 14309 | 1541 | 4779 | 300 | 580 | was melted in a salamander crucible with 25% of its weight of preformed slag containing 30% FeO, 25% CaO, 45% $SiO_2$. When completely molten, oxygen was again injected into the matte at 1.5 liters min$^{-1}$ for further periods of 7.5 minutes and 9.5 minutes, thus producing a copper bullion in situ as a method of contacting the matte phase.

These trials produced 23 wt % and 23.5 wt % of bullion respcetively and gave the following % recoveries into the bullion:

| Wt % of bullion | Au | Ag | Pt | Pd | Ru | Rh |
|---|---|---|---|---|---|---|
| 23 | 97.5 | 39 | 95 | 89.5 | 81 | 99 |

| Wt % of bullion | Au | Ag | Pt | Pd | Ru | Rh |
|---|---|---|---|---|---|---|
| 23.5 | 98.9 | 38.5 | 97 | 95 | 88.5 | 99 |

EXAMPLE 5

The following experiments demonstrate the improved separation of silver from the platinum group metals achieved by recirculation of the bullion to fresh quantities of matte.

Experiment 1

300 g of matte was treated in 100 g batches and 25 g copper was added to each 100 g batch in liquid form.
For each 100 g batch the weight of:
the resulting matte phase=97 g
the resulting bullion=27.2 g

| Input | | Output | |
|---|---|---|---|
| Head assay of matte % w/w | Matte % w/w | Bullion % w/w | |
| Cu | 71 | 73.8 | 85 |
| Ni | 3.2 | 2.03 | 5.0 |
| Fe | 1.5 | 1.1 | 0.23 |
| S | 19.1 | 18.8 | 2.1 |

| | ppm | ppm | ppm | % age recovery into bullion |
|---|---|---|---|---|
| Au | 462 | 16 | 1644 | 96 |
| Ag | 14309 | 10243 | 17294 | 32 |
| Pt | 1541 | 64 | 4493 | 95 |
| Pd | 4779 | 610 | 15284 | 87 |
| Ru | 30 | 17 | 526 | 90 |
| Rh | 580 | 30 | 1848 | 95 |

Ag recovered 27.2 g bullion @ 17294 ppm = 0.47 g.
Total Ag recovered for 3 lots of bullion = 1.41 g Ag

Experiment 2

300 g of the same matte was treated in 100 g batches and 50 g copper was added to each 100 g batch in liquid form.
For each 100 g batch the weight of:
the resulting matte phase=95.5 g
the resulting bullion=53.5 g
Analyses of the resulting matte and bullion:

| | Output | |
|---|---|---|
| | Matte % w/w | Bullion % w/w |
| Cu | 75.8 | 91.6 |
| Ni | 1.38 | 3.6 |
| Fe | 1.25 | 0.28 |
| S | 19.2 | 1.52 |

| | ppm | ppm | % age recovery into bullion |
|---|---|---|---|
| Au | less than 10 | 890 | 98 |
| Ag | 7330 | 11919 | 47 |
| Pt | 75 | 3697 | 96 |
| Pd | 318 | 8352 | 94 |
| Ru | 10 | 488 | 97 |
| Rh | 19 | 1212 | 97 |

Ag recovered 53.5 g bullion @ 11919 ppm = 0.638 g Ag
Total Ag recovered for 3 lots of bullion = 1.91 g Ag

Experiment 3

300 g of the same matte was treated in 100 g batches as before except that the same bullion resulting from the first batch was used to treat the second and the bullion resulting from the second batch was used to treat the third. An initial 50 g Cu was added to the first 100 g batch of matte in liquid form.

Total weight of matte used=300 g. Final weight of bullion produced=58.3 g.

Analyses of the resulting final matte and bullion:

|  | Output | |
|---|---|---|
|  | Matte % w/w | Bullion % w/w |
| Cu | 73.7 | 77.2 |
| Ni | 2.76 | 0.52 |
| Fe | 0.74 | 0.27 |
| S | 18.9 | 2.3 |
|  | ppm | ppm | % age recovery into bullion |
| Au | 32 | 2643 | 98 |
| Ag | 13270 | 18915 | 44 |
| Pt | 121 | 21324 | 99 |
| Pd | 1008 | 24840 | 93 |
| Ru | 15 | 16700 | 99 |
| Rh | 77 | 4811 | 97 |

Total weight of Ag recovered into 58.3 g bullion = 58.3 g @ 18915 ppm = 1.10 g Ag

SUMMARY OF EXAMPLE 5

| PGM | Ex 1 | Ex 2 | Ex 3 |
|---|---|---|---|
| % age pgm recovery  Pt | 95 | 96 | 99 |
| Pd | 87 | 94 | 93 |
| Ru | 90 | 97 | 99 |
| Rh | 95 | 97 | 97 |
| Ag recovery by weight  Ag | 1.41 | 1.91 | 1.10 |

Comparison of Experiment 3 with Experiments 1 and 2 show that with recirculation silver recovery into the bullion is less and platinum group metal recovery has a generally improving trend.

We claim:

1. A process for the recovery of platinum group metals, silver and gold from a Fe, Cu and Ni sulphide-containing leach residue which also contains Se and Te, said process comprising the following steps:
   (a) smelting the said leach residue with a flux to produce:
   (i) a slag containing FeO, CaO and $SiO_2$ and
   (ii) a copper matte phase containing S, the platinum group metals, Au, Ag, Se and Te, and an excess of Ni and/or Fe as defined in step (b) below,
   (b) removing excess, as defined below, of the elements iron or nickel or compounds thereof from the matte phase produced by step (a) by oxidation thus converting the said elements or compounds thereof to their respective oxides which then report to the slag phase, said excess being defined as more than about 5% by weight of iron, more than about 8% by weight of nickel or more than 12% by weight of the total of iron and nickel, based on the weight of the matte phase,
   (c) contacting the matte phase produced after oxidation step (b) in liquid form with one or more molten metals selected from the group consisting of Cu, Ni and Fe so as to produce a separate immiscible metallic phase containing platinum group metals, silver and gold, and
   (d) recovering silver from the matte phase and the platinum group metals, gold and the proportion of silver which remains from the metallic phase.

2. A process according to claim 1, wherein the smelting operation in step (a) is carried out at a temperature within the range 1100°–1300° C.

3. A process according to claim 1, wherein the flux used in step (a) contains iron oxide and silica and lime.

4. A process according to claim 1, wherein the flux used in step (a) contains iron silicate, lime and magnesia.

5. A process according to claim 3, wherein the flux contains one or more of $Ca(OH)_2$ and alkali metal carbonate instead of lime.

6. A process according to claim 3, wherein the flux also contains one or more of alkali metal chloride and MgO.

7. A process according to claim 4, in which the flux comprises 1–30 wt % CaO, 0–20 wt % MgO, 20–60 wt % FeO and 30–45 wt % $siO_2$.

8. A process according to claim 1, wherein the oxidation at step (b) is carried out at a temperature within the range 1200°–1250° C.

9. A process according to claim 1, wherein contacting at step (c) is carried out when the said metal or alloy of metals is molten and the matte is in the liquid state.

10. A process according to claim 9, wherein the said metal is copper.

11. A process according to claim 1, wherein contacting at step (c) is effected by the in situ production of metal.

12. A process according to claim 11, wherein the in situ production of metal is obtained by continuing the injection of oxygen or air into the matte phase of step (b).

13. A process according to claim 1 which includes the step of recirculating the separate metallic phase produced by step (c) and contacting the same with a separately produced matte phase produced by step (a) or by steps (a) and (b) so as to at least partially redistribute the silver present out of the metallic phase.

* * * * *